United States Patent [19]
Francovich et al.

[11] Patent Number: 5,828,547
[45] Date of Patent: Oct. 27, 1998

[54] COMPUTER CASE HAVING SLIDABLY INSERTABLE DRIVE HOUSING WITH U-SHAPED MOUNTING BRACKET HAVING INWARDLY PROJECTING PINS ON TWO OPPOSED LEGS

[75] Inventors: Walter Francovich, Pierrefonds; Gad Shaanan, Westmount; Derek Hunziker, Montréal; Joseph Germain Maurice Paul Girard; Vladislav Ircha, both of Richmond, all of Canada

[73] Assignee: Seanix Technology Inc., Richmond, Canada

[21] Appl. No.: 660,780

[22] Filed: Jun. 10, 1996

[51] Int. Cl.⁶ .............................. G06F 1/16; G11B 33/02; H05K 7/10
[52] U.S. Cl. .............................................. 361/685; 361/726
[58] Field of Search ........................ 364/78.1; 312/223.2; 361/683, 685, 725, 726, 727; 360/137, 97.01, 98.01

[56] References Cited

U.S. PATENT DOCUMENTS

| | | |
|---|---|---|
| 4,356,531 | 10/1982 | Marino et al. . |
| 4,971,563 | 11/1990 | Wells, III . |
| 4,992,903 | 2/1991 | Chen . |
| 5,031,070 | 7/1991 | Hsu .......................................... 361/683 |
| 5,121,296 | 6/1992 | Hsu .......................................... 361/685 |
| 5,124,885 | 6/1992 | Liu ........................................... 361/683 |
| 5,124,886 | 6/1992 | Golobay . |
| 5,136,468 | 8/1992 | Wong et al. . |
| 5,164,886 | 11/1992 | Chang . |
| 5,209,356 | 5/1993 | Chaffee . |
| 5,227,954 | 7/1993 | Twigg . |
| 5,235,493 | 8/1993 | Yu ............................................ 361/685 |
| 5,248,193 | 9/1993 | Schlemmer . |
| 5,262,923 | 11/1993 | Batta et al. ............................. 361/685 |
| 5,269,598 | 12/1993 | Liu . |
| 5,306,079 | 4/1994 | Liu ....................................... 361/685 X |
| 5,333,097 | 7/1994 | Christensen et al. . |
| 5,438,476 | 8/1995 | Steffes . |
| 5,466,059 | 11/1995 | Liu . |
| 5,513,068 | 4/1996 | Girard ..................................... 361/685 |
| 5,595,501 | 1/1997 | Ho ....................................... 361/685 X |
| 5,596,484 | 1/1997 | Suzuki .................................... 361/685 |
| 5,682,291 | 10/1997 | Jeffries et al. .......................... 361/685 |

FOREIGN PATENT DOCUMENTS

| | | |
|---|---|---|
| 154243 | 11/1993 | China . |
| 82206567 | of 0000 | Taiwan . |

*Primary Examiner*—Michael W. Phillips
*Attorney, Agent, or Firm*—Fulbright & Jaworski L.L.P.

[57] ABSTRACT

A computer case having at least one 3½" drive housing which can be removably mounted within the case. Each 3½" drive housing has one or more (typically, two) channels. A 3½" drive is slidably insertable within each channel. A plurality (normally, as many as four) 3½ drive housings are removably mountable at different locations within the case via quick release connectors provided at different locations within the case. A "U" shaped mounting bracket captures each 3½" drive. The bracket has two opposed legs, with one or more inwardly projecting pins on each leg. The pins slide into apertures located in the opposed sides of industry standard 3½" drives. A one-piece backplane with quick release connectors is easily removed and replaced by adjacent a cutout provided in an outer wall of the case. A series of cutouts are provided in the backplane. Each cutout is positioned to align with a connector on a motherboard mounted in the case, when the backplane is in place adjacent the case outer wall cutout. This allows external plug-in connectors to protrude through the backplane cutouts for direct connection with the motherboard connectors.

8 Claims, 6 Drawing Sheets

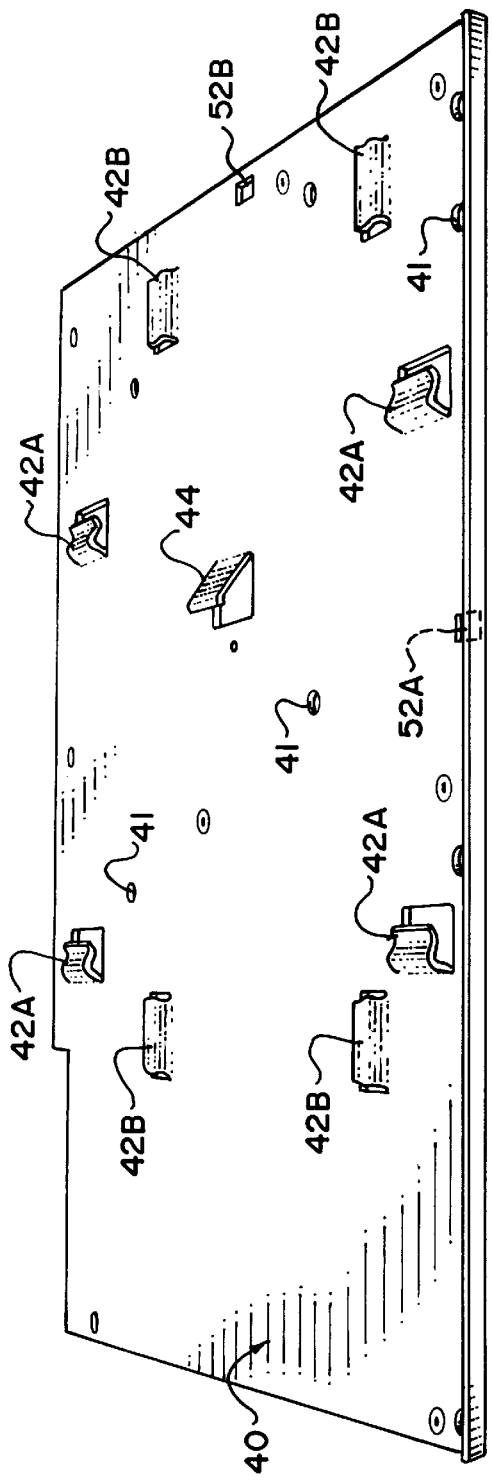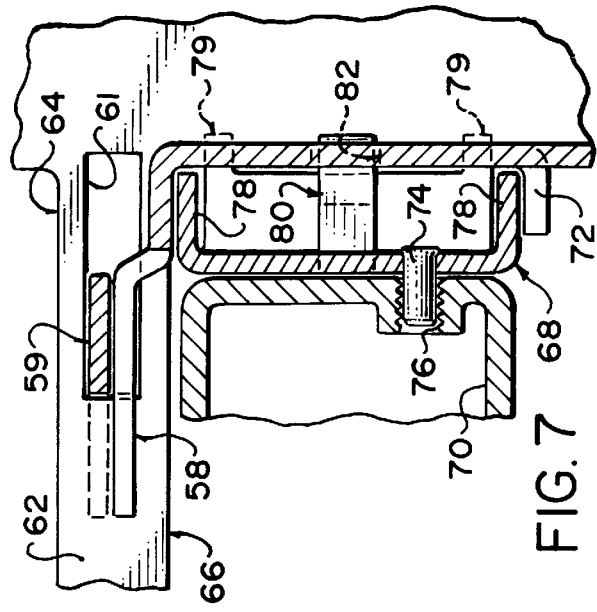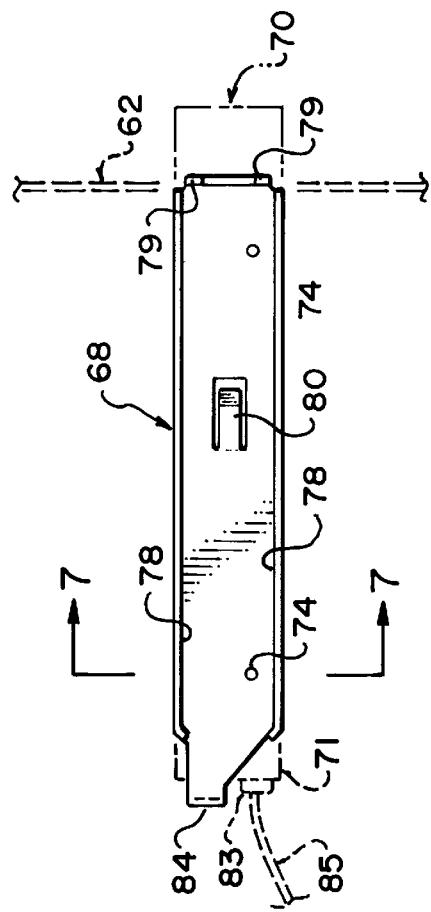

COMPUTER CASE HAVING SLIDABLY INSERTABLE DRIVE HOUSING WITH U-SHAPED MOUNTING BRACKET HAVING INWARDLY PROJECTING PINS ON TWO OPPOSED LEGS

FIELD OF THE INVENTION

This application pertains to a personal computer case having quick connect drive housings, backplane, motherboard mounting plate, etc. which can easily be removed and replaced to accommodate a wide range of custom configurations incorporating different motherboards, drives, etc.

BACKGROUND OF THE INVENTION

Personal computers ("PCs") commonly comprise a sheet metal case containing a motherboard, one or more drive housings holding various drives, a power supply and various other components. To assemble a PC, the manufacturer determines which motherboard, drives, power supply, etc. are required. Those components are then fastened within the case, typically with screws.

The rapid evolution of PC technology can quickly render a PC obsolete, by virtue of the fact that if any one of the PC's components becomes obsolete the entire PC is obsolete. As such, the ability to minimize the number of different PC configurations (hard disk size, CPU speed, etc.) and simultaneously maximize the ability to rapidly interchange components such as add-on cards, disk drives, motherboards, etc. at a location close to the customer is a critical success factor for a PC manufacturer. Further, the ability of the PC user to easily add or change components after purchasing the PC is an appealing feature. PC retailers and service organizations typically charge fixed hourly rates for assembling, configuring or servicing PCs. It is to their benefit to have a PC case which allows maximum convenience and flexibility in interchangeability of components.

For example, motherboards typically undergo major redesign at roughly six month intervals. Unless steps are taken to adapt a new motherboard design to mate with whatever motherboard mounting and connection mechanism is provided in the PC case, the new motherboard may not be usable in the case unless the case is modified. For example, recent trends in motherboard design necessitate protrusion, through the rear wall of the case, of various connectors provided on the motherboard. Previously, cables were used to couple such connectors to other connectors fixed in the rear wall of the case. The cables gave case designers some flexibility in location of the rear wall connectors. But, the connectors on modern motherboards must be directly accessed through cutouts provided in the rear wall of the case. It is expected that different motherboard manufacturers will select different layouts for their motherboard connectors, thus requiring case manufacturers to provide cases having rear walls capable of accepting a variety of connector layouts.

The continuing popularity of two different PC case configurations known as the "desktop" and "tower" configurations places additional burdens on case manufacturers. In the "desktop" configuration, the larger planar surfaces of the case lie horizontally; in the "tower" orientation they stand vertically. The PC user decides which configuration is preferable, based on factors such as available space, location of and access to peripheral devices, and personal preference; then orders a PC of that configuration.

In prior art PC cases, the drive housings are typically capable of receiving drives in only one orientation thus fixing the orientation of the drives relative to the case. Originally, only desktop cases were available. In a desktop case the drive housings are fixed to the case such that drives mounted in the housings extend parallel to the case's larger planar surfaces, which in turn lie parallel to the supporting surface on which the user rests the case in the desktop orientation. If the user decides to stand the case on one of its narrower ends in the "tower" orientation, then the drives extend vertically relative to the surface on which the case rests. In many situations this does not cause problems. But some drives, including many types of cd-rom drives, operate satisfactorily only when they are substantially horizontal. To address this problem PC manufacturers adopted a special "tower" case in which the drive housings are fixed to the case at 90° relative to the positioning of the drive housings in a desktop case. When placed in the vertical "tower" orientation, the tower case maintains the drives horizontal relative to the support surface on which the case rests. But, manufacturers and retailers are left with the problem of maintaining inventories of at least two different types of cases to suit the preferences of both desktop and tower users.

The present invention solves the foregoing and other problems by providing a single PC case which can be used in either the desktop or tower orientation while maintaining the drives horizontally to the support surface on which the case rests in either orientation. The invention also accommodates a wide range of different motherboards by providing a removable backplane which can easily be snapped into place in the rear wall of the PC case. Different backplanes can be quickly substituted in order to accommodate different motherboard connector requirements. A motherboard base plate is also provided. The base plate can quickly be snapped into position within the case in either of two different orientations. A variety of different motherboard connection layouts are provided on the base plate. By selecting an appropriate layout and an appropriate orientation of the base plate within the case, one may accommodate many different motherboard designs in one case. The invention also provides a PC case which can accommodate up to eight 3½" drives in four separate housings, each of which can easily be snap-fitted into position within the case. A 5¼" drive housing capable of receiving drives either horizontally or vertically is also provided. Brackets are provided to ease slidable insertion of the various drives into the respective housings.

SUMMARY OF THE INVENTION

In accordance with the preferred embodiment, the invention provides a computer case having at least one 3½" drive housing which can be removably mounted within the case. Each 3½" drive housing has one or more (typically, two) channels. A 3½" drive is slidably insertable within each channel. A plurality of (normally, as many as four) 3½" drive housings are removably mountable at different locations within the case via quick release connectors provided at different locations within the case.

A "U" shaped mounting bracket is provided for each 3½" drive. The bracket has two opposed legs. One or more inwardly projecting pins are provided on each leg. The pins are slidably receivable within apertures located in the opposed sides of industry standard 3½" drives.

The invention also provides a one-piece backplane with quick release connectors. The backplane can easily be removed and replaced with another backplane, adjacent a cutout provided in an outer wall of the case. A series of cutouts are also provided in the backplane. Each backplane cutout is positioned to align with a connector on a motherboard mounted in the case, when the backplane is mounted adjacent the case outer wall cutout. This allows connectors on the motherboard to protrude through the backplane cutouts for direct connection with external cables.

The invention also provides a motherboard base plate mounting bracket fixed within the case. A motherboard base plate can be removably snap-fitted onto the mounting bracket, in either one of two 90° opposed orientations. At least two separate sets of mounting locations are provided on the base plate for receiving connectors for attaching a motherboard to the base plate. Each set of mounting locations corresponds to a different industry standard motherboard mounting connector location.

The invention additionally provides a 5¼" drive housing which is fixed within the case. This housing has one series of channels for slidably receiving one or more 5¼" drives in a first orientation, and a second series of channels for alternatively slidably receiving the 5¼" drives in a second orientation transverse to the first orientation.

BRIEF DESCRIPTION OF THE DRAWINGS

FIG. 5 is an oblique view, in perspective, of the bottom of the motherboard base plate.

FIG. 6 is a side elevation view of an external 3½" drive mounting bracket.

FIG. 7 is a section view taken with respect to line 7—7 of FIG. 6.

DETAILED DESCRIPTION OF THE PREFERRED EMBODIMENT

Quick Connect/Disconnect Backplane

Figure 1:
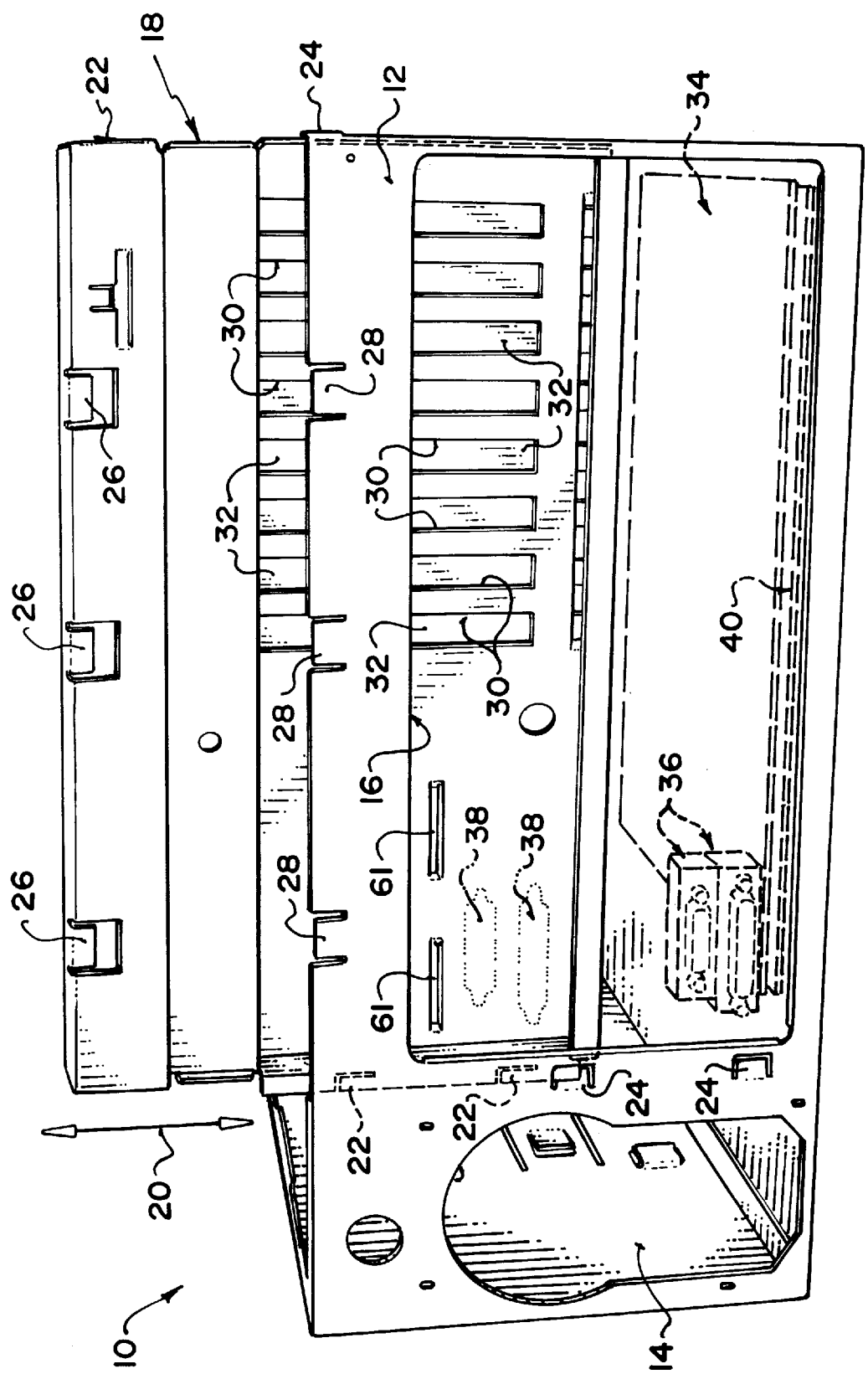
FIG. 1 is a rear perspective view of a portion of a computer case according to the invention.

As shown in FIG. 1, the invention provides a sheet metal computer case 10 having a rear wall 12 in which cutouts 14, 16 are provided. Cutout 14 accommodates a power supply (not shown) within case 10 in a manner well known in the art. Cutout 16 provides access through rear wall 12 for external connectors which are coupled to mating motherboard connectors 36 which project through an easily removable, one-piece sheet metal backplane 18.

Backplane 18 can be slidably removed or inserted within case 10 by moving backplane 18 in the direction indicated by double-headed arrow 20. Quick release interlocking fasteners 22 provided at the upper and lower outward ends of backplane 18 engage mating tab fittings 24 provided on the inner surface and outer edge of rear wall 12 to hold backplane 18 in place once it has been fully lowered into position. A further series of quick release interlocking fasteners 26 are provided along the top rear edge of backplane 18 for releasable engagement with mating projections 28 provided along the upper edge of rear wall 12.

Figure 2:
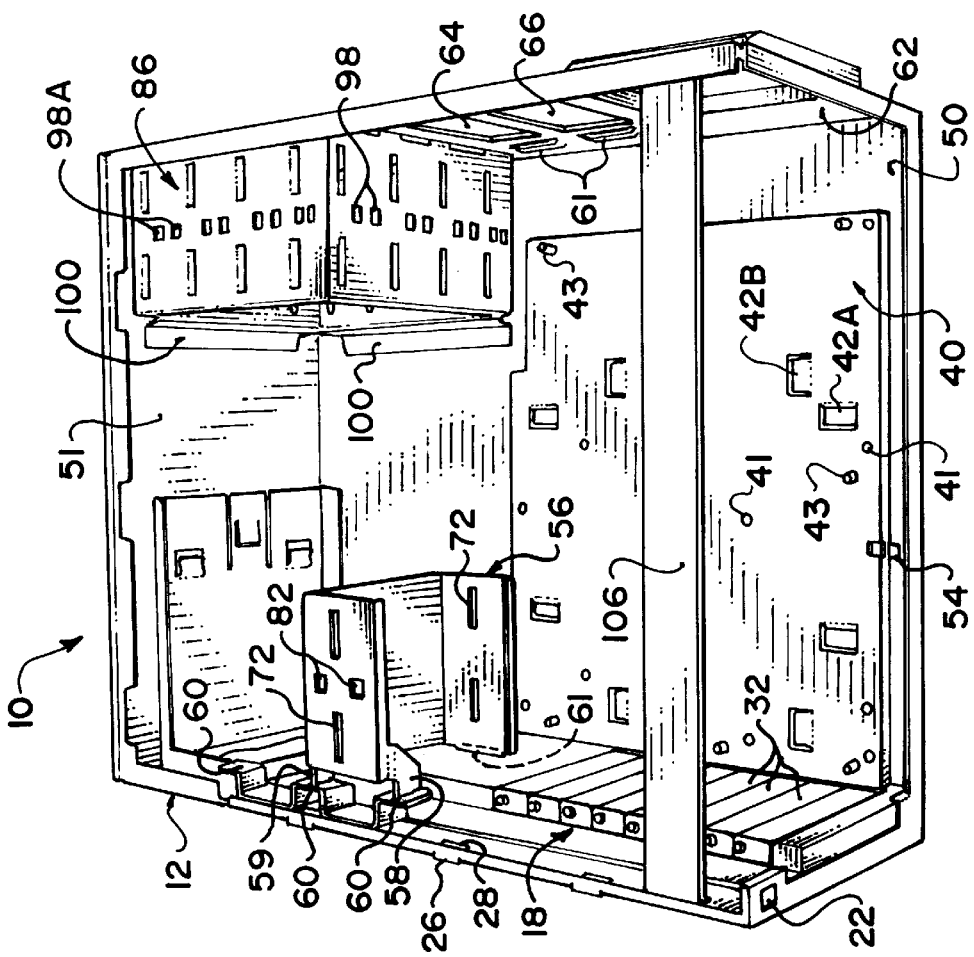
FIG. 2 is an upper left oblique perspective view of the case, with the top and left sides exposed.

Backplane 18 has a series of vertically oriented cutouts 30, each of which is equipped, in conventional fashion, with a cover plate 32 (FIG. 2). Cover plates 32 may be selectively removed to expose any of the corresponding cutouts 30. This facilitates protrusion, through the exposed cutout 30, of the end of a plug-in circuit card (not shown) held in a connector (not shown) provided on motherboard 34.

Motherboard 34 also carries the aforementioned connectors 36 for coupling to video monitors, printers, keyboards and the like. Connectors 36 are provided on motherboard 34 in locations selected by the motherboard manufacturer. Such locations may differ on motherboards of different manufacturers. Accordingly, backplane 18 is customized for a particular motherboard connector layout by providing additional knock-out portions or cutouts 38 (shown in dotted outline) which are of a size and location suitable to allow connectors 36 to project therethrough. If motherboard 34 is replaced with another motherboard having a different arrangement of connectors 36; or different cabling requirements; or having plug-in circuit card connectors which require a different size or orientation of backplane cutouts 30; then backplane 18 can easily be lifted upwardly, removed from case 10 and replaced with another backplane having a different arrangement of knock-outs 38 and/or cutouts 30 suited to the new motherboard.

Backplane 18 can accommodate any desired layout of cutouts 30, or knockouts 38. For example, cutouts 30 may extend either horizontally or vertically, without restriction.

Quick Connect/Disconnect Motherboard Base Plate

Figure 3:
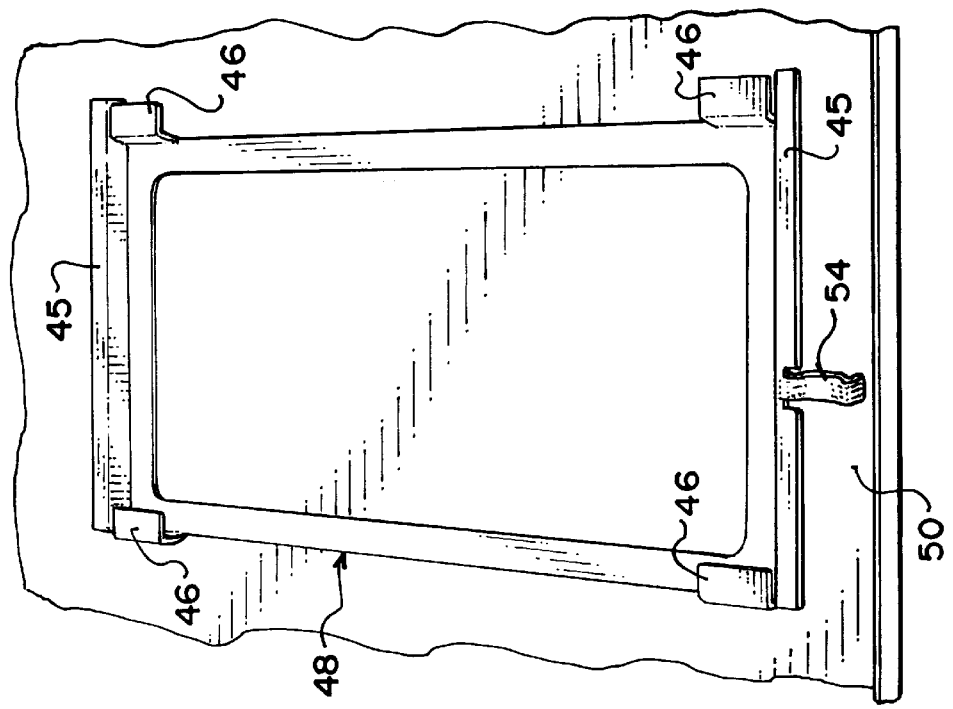
FIG. 3 is a top oblique partial fragmentary view of the inside bottom wall of the case, showing the motherboard base plate mounting bracket.
Figure 4:
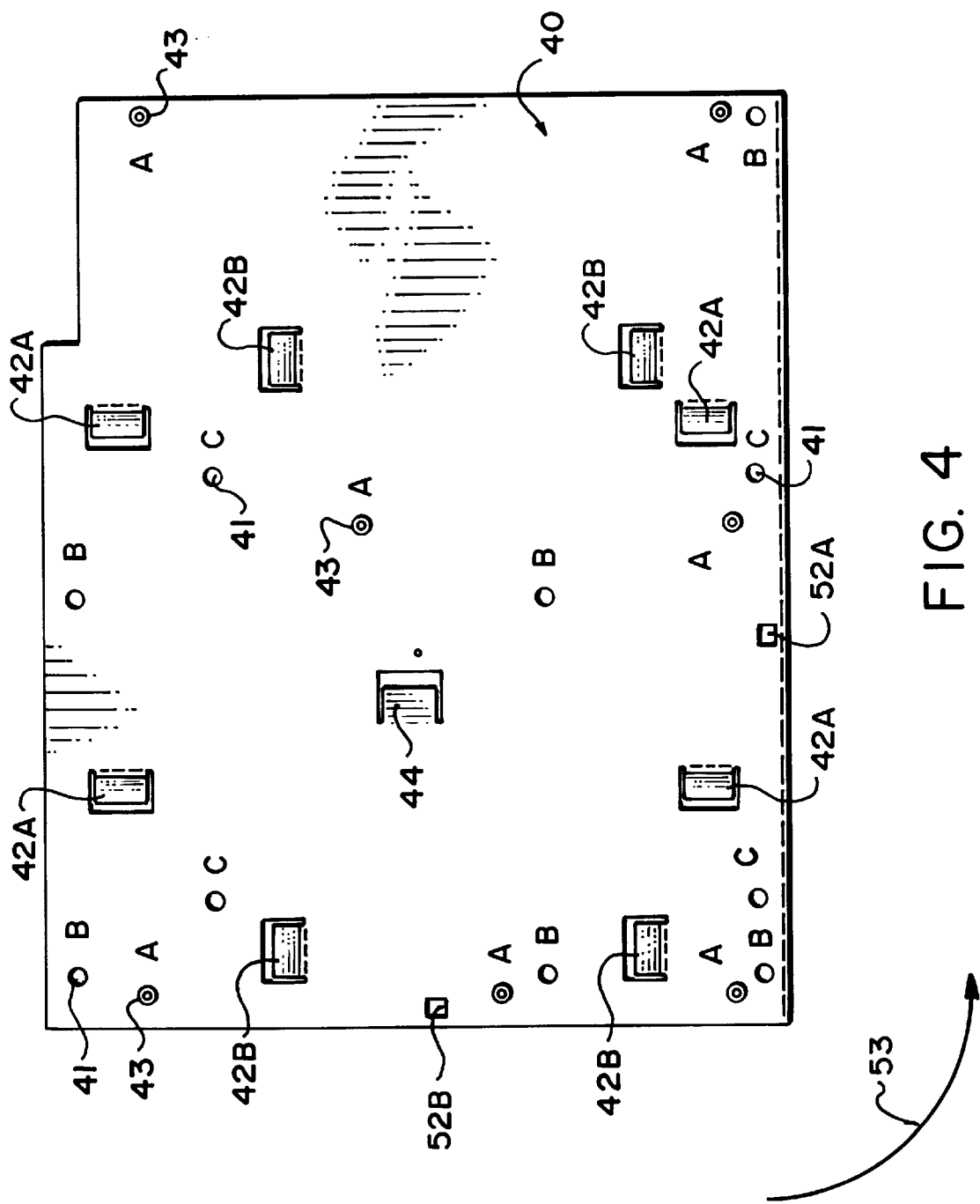
FIG. 4 is a top plan view of the motherboard base plate.

Motherboard 34 is mounted on a motherboard base plate 40 (FIGS. 2, 4 and 5) which is in turn mounted within case 10 with the aid of mounting bracket 48 shown in FIG. 3. As best seen in FIGS. 4 and 5, base plate 40 has two sets of downwardly protruding spring tabs or "friction engagement members" 42A and 42B which are formed integrally with base plate 40. A grounding spring tab 44 is also formed integrally with base plate 40.

Upwardly projecting guide rails 45 (FIG. 3) facilitate positioning of base plate 40 within case 10 in either one of two orientations which are 90° opposed to one another within the plane of base plate 40. In the first orientation, each of spring tabs 42A is interlocked with corresponding friction engagement members, namely upwardly protruding flanges 46 provided on mounting bracket 48 (FIG. 3) which is fixed to the inner bottom wall 50 of case 10. In particular, after motherboard 34 is attached to base plate 40 as hereinafter explained, base plate 40 is positioned within case 10 such that spring tabs 42A underlie the corresponding flanges 46 of bracket 48. The respective spring tabs and flanges are constructed to frictionally engage one another in quick release fashion. Upon such engagement, downwardly protruding grounding tab 44 makes contact with case bottom wall 50. Mounting bracket 48 has a locking spring lever 54 which engages either of base plate apertures 52A or 52B, depending upon the orientation of base plate 40 relative to mounting bracket 48. In the second orientation, base plate 40 is rotated 90° (i.e. in the direction of arrow 53 shown in FIG. 4) to bring spring tabs 42B into the positions formerly occupied by spring tabs 42A. In such orientation, spring tabs 42B are positioned for frictional, quick connect, quick disconnect engagement with flanges 46 of bracket 48.

Base plate 40 is also equipped with three different sets of apertures 41 which are respectively marked "A", "B" and "C" in FIG. 4. One of the three sets of apertures may be fitted with conventional stand-off connectors 43 (as seen in the "A" set) to facilitate attachment of motherboard 34 to base plate 40. It can thus be seen that a range of options are provided for attaching motherboard 34 to base plate 40 and for mounting the resultant combination of motherboard and base plate within case 10. This facilitates mounting most industry standard motherboards within case 10.

Quick Connect/Disconnect 3½" Drive Housing

FIG. 2 also illustrates a sheet metal housing 56 within which one or two 3½" drives may be mounted. As many as four 3½" drive housings 56 can be removably mounted within case 10, thus providing for inclusion of up to eight 3½" drives within case 10.

Hook-shaped support flanges 58, 59 protrude from the upper rear ends of housing 56 for mating engagement with slot connectors 60 provided along the upper, inner portion of backplane 18. Two separate, adjacent sets of slot connectors 60 are provided for quick connect, quick disconnect mounting of two separate drive housings 56 forwardly of rear wall 12 within case 10. Slots 61 (FIGS. 1 and 2) formed in backplane 18 receive lower, rearwardly protruding flange portions of housing 56. Another two separate sets of slot connectors (not shown) 61 are provided in front wall 62 of case 10, in juxtaposition to front wall cutouts 64, 66. These additional slot connectors facilitate removable attachment of another two separate housings 56 containing up to another four 3½" drives, the forward portions of which may protrude through cutouts 64 or 66 for user insertion of diskettes, etc.

In each case, the actual number of housings 56 provided will depend upon factors such as the number of 3½" drives required by the computer user, available space (some motherboard and circuit card combinations may prevent mounting of a housing 56 in the position shown in FIG. 2), the desirability of minimizing the overall size of the case, the need to provide adequate space for cooling air to circulate within the case, etc.

3½" Drive Mounting Bracket

A U-shaped bracket 68 (FIGS. 6, 7 and 8) is provided to hold each 3½" drive (illustrated diagrammatically only at 70) for slidable insertion thereof within either of two channels defined in housing 56 (FIG. 2) by horizontally aligned tabs 72, which are bent inwardly during fabrication of housing 56.

Figure 8:
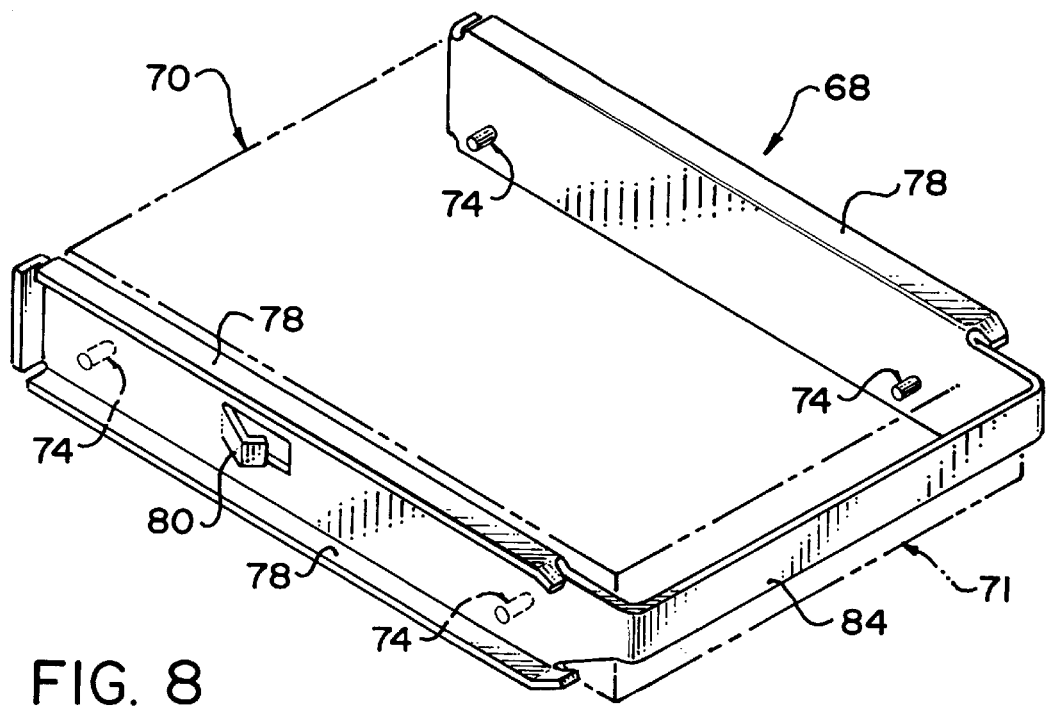
FIG. 8 is a rear and left side isometric view of an internal 3½" drive mounting bracket.

As best seen in FIG. 8, four pins 74 are fixed to bracket 68, with one pair of pins disposed on each inward facing leg of the "U". Pins 74 are located such that they may protrude within threaded apertures 76 (FIG. 7) provided in standardized locations on industry standard 3½" drives. Threaded engagement of pins 74 within apertures 76 is unnecessary. With pins 74 inserted as aforesaid, drive 70 is captured by bracket 68 such that the bracket's outwardly protruding flanges 78 serve as runners which guide slidable insertion of bracket 68 and drive 70 within one of the two channels defined in housing 56.

Outwardly projecting spring tab 80 formed in one leg of "U" bracket 68 engages one of slots 82 of housing 56 to prevent accidental dislodgement of drive 70 from housing 56. Slots 82 are located in the side of housing 56 which faces upwardly when housing 56 is mounted in case 10. This provides ready access to tab 80 through slot 82 if bracket 68 and drive 70 have to be removed from housing 56.

The lower horizontally extending portion of rear leg 84 of bracket 68 is removed to provide clearance around connectors 83 on rear end 71 of drive 70 so that power or data cable connectors 85 may be plugged into connectors 83.

Broadly speaking, there are two types of 3½" drive: internal drives such as hard drives which do not require user access, and external drives such as floppy drives which require user access for removable storage media such as floppy diskettes. Drive 70 depicted in FIG. 6 is an external drive, whereas drive 70 depicted in FIG. 8 is an internal drive. Tab 80 shown in the FIG. 6 external drive bracket projects from the rear end of the bracket, whereas tab 80 shown in the FIG. 8 internal drive bracket projects from the front end of the bracket. This is because the FIG. 6 external drive bracket is inserted into housing 56 commencing with the bracket's rear end (i.e. leg 84), whereas the FIG. 8 internal drive bracket is inserted into housing 56 commencing with the bracket's open front end so that cables connected to the rear end 71 of the internal drive are kept away from the case wall on which housing 56 is mounted.

Bracket 68 shown in FIG. 6 has stop flanges 79 which contact the outward face of case front wall 62 when the bracket is inserted through either of apertures 64, 66 into one of the channels in a housing 56 mounted rearwardly of such apertures. Stop flanges 79 thus maintain proper alignment with case front wall 62 of the frontal portion of an external drive mounted in bracket 68. Bracket 68 shown in FIG. 8 does not require stop flanges since internal drives do not require such alignment.

5¼" Drive Housing

Figure 11:
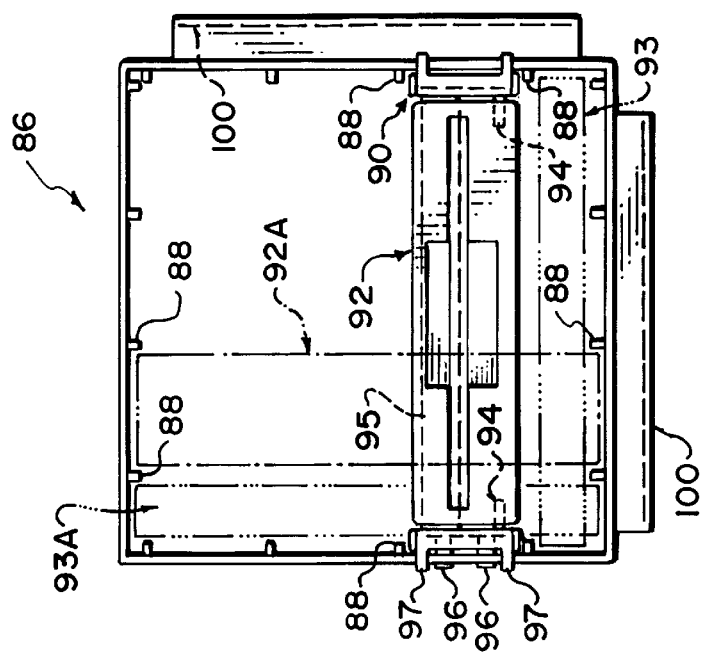
FIG. 11 is a front elevation view of the housing of FIG. 10, showing one 5¼" drive slidably mounted therein with the aid of the FIG. 9 mounting bracket and showing (in phantom outline) another 5¼" drive slidably mounted therein in an alternative, transverse orientation.
Figure 10:
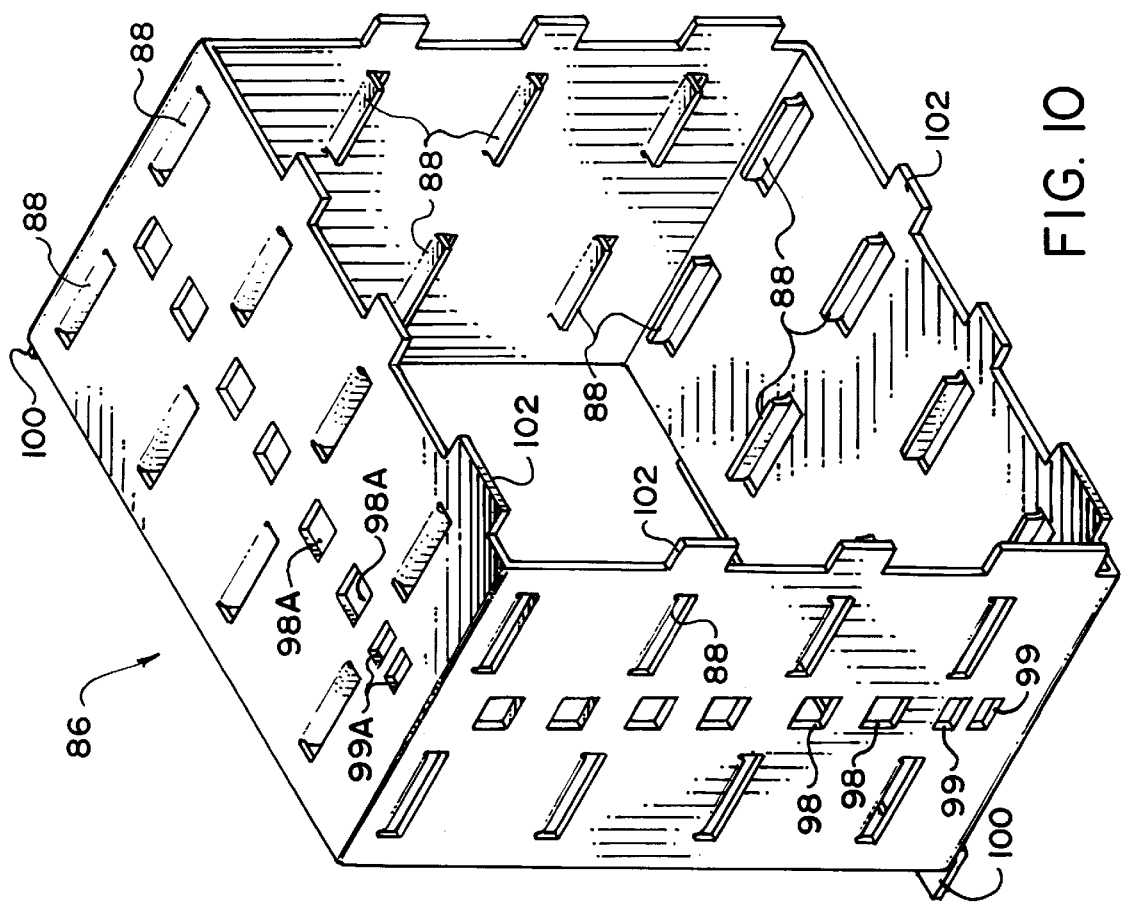
FIG. 10 is an isometric view of a 5¼" drive housing capable of receiving drives in either one of two transversely opposed orientations.

A sheet metal 5¼" drive housing 86 is fixed within case 10 behind front wall 62, as seen in FIG. 2. As best seen in FIG. 10, housing 86 is formed with a series of inwardly protruding tabs 88 in each surface thereof. Tabs 88 are provided in longitudinally aligned pairs, with each such pair being further aligned with a corresponding pair of longitudinally aligned tabs formed in the transversely opposed wall of housing 86. Such transversely opposed tabs define the upper and lower bounds of a channel into which a 5¼" drive may be slidably inserted as hereinafter explained. Because tabs are provided in all four walls of housing 86, the drive may be inserted in either one of two 90° opposed orientations, as seen in FIG. 11 at 92 and 92A. Thus, the drives are easily adapted to horizontal orientation, regardless of whether case 10 is used in the "tower" or "desktop" configuration.

Figure 9:
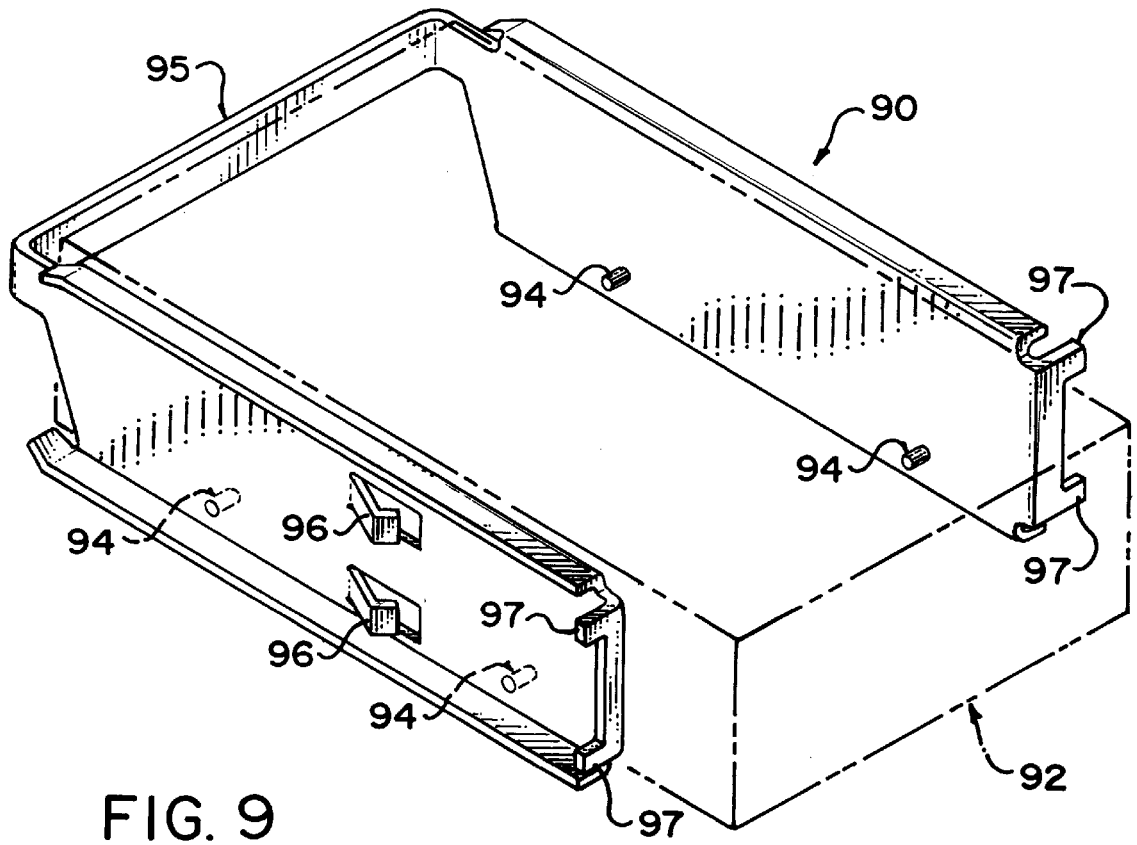
FIG. 9 is a front and right side isometric view of a 5¼" drive mounting bracket.

FIG. 9 depicts a U-shaped mounting bracket 90 which facilitates slidable insertion of 5¼" drive 92 into one of the previously mentioned channels of housing 86. Four pins 94 are provided on the opposed inward facing legs of the "U" for slidable insertion within apertures provided in fixed locations on industry standard 5¼" drives. Once drive 92 is captured by bracket 90 in this fashion the assembly is slidably inserted into housing 86 as shown in FIG. 11. Outwardly projecting tabs 96 provided in one leg of "U" bracket 90 engage within slots 98 (or 98A) provided in housing 86 to prevent accidental dislodgement of drive 92 from housing 86. Slots 98, 98A are located in the sides of housing 86 which face away from case walls 50 and 51 when housing 86 is mounted in case 10, to provide ready access to tabs 96 if bracket 90 and drive 92 have to be removed from housing 86. Flanges 100 fixed along two sides of housing 86 facilitate welding thereof to case walls 50, 51 as seen in FIG. 2, thereby strengthening case 10. Frontal tabs 102 (FIG. 10) facilitate initial alignment of housing 86 within an aperture provided in case front wall 62, prior to welding of flanges 100 to case walls 50, 51. Tabs 102 also ensure a closed fit of housing 86 within case 10, in compliance with F.C.C. emission standards. Snap-in bar 106 enhances rigidity of case 10.

As seen in FIG. 11, housing 86 is made square in frontal cross-section by providing additional spaces for horizontal or vertical inclusion of a control panel bearing conventional on-off and other switches for controlling operation of the PC. In the horizontal orientation, the control panel 93 is mounted immediately beneath the location in which drive 92 is shown in solid lines in FIG. 11. In the vertical orientation 93A, the control panel is mounted immediately to the left of the location in which drive 92A is shown in dotted outline in FIG. 11.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A computer case comprising a 3½" drive housing removably mountable within said case, said 3½" drive housing having one or more channels for slidable insertion within said 3½" drive housing of one or more 3½" drives, further comprising a "U" shaped mounting bracket for each one of said 3½" drives, said bracket having two opposed legs, each of said legs having one or more inwardly projecting pins slidably receivable within an aperture located in a side of said 3½" drive.

2. A computer case as defined in claim 1, wherein said opposed legs have upper and lower flanged surfaces for slidable insertion of said bracket within any selected one of said one or more channels.

3. A computer case as defined in claim 1, wherein said 3½" drive housing further comprising, for each one of said one or more channels, at least one slot provided in an outer wall of said housing adjacent said respective channels, said slot for removably engaging a releasable connector provided on at least one of said bracket legs.

4. A computer case comprising a 5¼" drive housing fixed within said case, said 5¼" drive housing having a first series of channels for slidable insertion within said 5¼" drive housing of one or more 5¼" drives in a first orientation, and having a second series of channels for alternative slidable insertion within said 5¼" drive housing of said one or more 5¼" drives in a second orientation transverse to said first orientation.

5. A computer case as defined in claim 4, wherein said first and second series of channels are defined by inwardly protruding tabs formed integrally with said 5¼" drive housing, each said channel further defined by at least first upper and lower tabs located on one side of said 5¼" drive housing and second upper and lower tabs located on a transversely opposed side of said 5¼" drive housing in transverse alignment with said first upper and lower tabs.

6. A computer case as defined in claim 4, further comprising a "U" shaped mounting bracket for each one of said 5¼" drives, said bracket having two opposed legs, each of said legs having one or more inwardly projecting pins slidably receivable within an aperture located in a side of said 5¼" drive.

7. A computer case as defined in claim 6, wherein said opposed legs have upper and lower flanged surfaces for slidable insertion of said bracket within any selected one of said first or second series of channels.

8. A computer case as defined in claim 6, wherein said 5¼" drive housing further comprising, for each one of said first series of channels, at least one slot provided in a first outer wall of said housing adjacent said respective first series channels; and, for each one of said second series of channels, at least one slot provided in a second outer wall of said housing transverse to said first wall and adjacent said respective second series channels, said slots for removably engaging a releasable connector provided on one of said bracket legs.

* * * * *